US012573556B2

(12) United States Patent
Hwang et al.

(10) Patent No.: US 12,573,556 B2
(45) Date of Patent: Mar. 10, 2026

(54) MULTILAYER ELECTRONIC COMPONENT

(71) Applicant: SAMSUNG ELECTRO-MECHANICS CO., LTD., Suwon-si (KR)

(72) Inventors: Moon Kyung Hwang, Suwon-si (KR); Moon Soo Park, Suwon-si (KR); Seung Hyun Noh, Suwon-si (KR); Jin Woo Kim, Suwon-si (KR); Chung Hwan Kim, Suwon-si (KR); Hyun Woo Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 163 days.

(21) Appl. No.: 18/526,431

(22) Filed: Dec. 1, 2023

(65) Prior Publication Data

US 2024/0203652 A1     Jun. 20, 2024

(30) Foreign Application Priority Data

Dec. 14, 2022     (KR) ........................ 10-2022-0174996

(51) Int. Cl.
*H01G 4/30* (2006.01)
*H01G 4/005* (2006.01)
*H01G 4/12* (2006.01)
*H01G 4/232* (2006.01)

(52) U.S. Cl.
CPC .......... *H01G 4/1227* (2013.01); *H01G 4/005* (2013.01); *H01G 4/232* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 2018/0222801 A1* | 8/2018 | Hirose | .................. | C04B 35/462 |
| 2019/0180936 A1* | 6/2019 | Cha | .......................... | C04B 35/47 |
| 2019/0355517 A1* | 11/2019 | Chigira | ............... | H01G 4/1227 |
| 2019/0355519 A1 | 11/2019 | Taniguchi | | |
| 2020/0234886 A1 | 7/2020 | Shibasaki et al. | | |
| 2020/0335280 A1* | 10/2020 | Tanaka | ................. | H01G 4/0085 |
| 2021/0012968 A1 | 1/2021 | Taniguchi | | |
| 2021/0159014 A1* | 5/2021 | Kowase | ................... | H01G 4/33 |
| 2021/0166882 A1* | 6/2021 | Nishiura | ................. | H01G 4/30 |

(Continued)

FOREIGN PATENT DOCUMENTS

| | | | |
|---|---|---|---|
| JP | 6370744 B2 * | 8/2018 | |
| JP | 2018-139253 A | 9/2018 | |

(Continued)

OTHER PUBLICATIONS

The Extended European Search Report dated Aug. 5, 2024 issued in European Patent Application No. 23213938.6.

*Primary Examiner* — Timothy J. Dole
*Assistant Examiner* — Esther N Lian
(74) *Attorney, Agent, or Firm* — Morgan Lewis & Bockius LLP

(57) ABSTRACT

The present disclosure provides a multilayer electronic component which may improve a break down voltage (BDV) characteristic by adjusting a ratio of a content of an element included in a first or second region of a dielectric layer to reduce a difference in dielectric grain size dispersion and grain density in the first or second region.

22 Claims, 11 Drawing Sheets

(56)            References Cited

U.S. PATENT DOCUMENTS

| | | | |
|---|---|---|---|
| 2021/0175020 A1* | 6/2021 | Takei ..................... | H05K 1/185 |
| 2021/0210285 A1 | 7/2021 | Sasabayashi et al. | |
| 2021/0272755 A1 | 9/2021 | Kato | |
| 2021/0287853 A1 | 9/2021 | Sasabayashi et al. | |
| 2021/0304969 A1* | 9/2021 | Ishii ..................... | H01G 4/1227 |
| 2021/0366658 A1* | 11/2021 | Yamato ............... | H01G 4/1227 |
| 2022/0102076 A1* | 3/2022 | Isota ..................... | H01G 4/008 |
| 2023/0126670 A1* | 4/2023 | Kim ...................... | H01G 4/232 |
| | | | 361/301.4 |
| 2023/0290577 A1* | 9/2023 | Tsushima ............. | H01G 4/1218 |
| 2024/0013980 A1* | 1/2024 | Tsutsumi ............. | H01G 4/0085 |

FOREIGN PATENT DOCUMENTS

| | | | | | |
|---|---|---|---|---|---|
| JP | 6595670 | B2 | 10/2019 | | |
| JP | 2019-201134 | A | 11/2019 | | |
| JP | 2021-150300 | A | 9/2021 | | |
| JP | 7227690 | B2 * | 2/2023 | ............. | H01G 4/012 |
| KR | 10-2019-0015453 | A | 2/2019 | | |
| KR | 20190060965 | A * | 6/2019 | .......... | C04B 35/475 |
| KR | 20190067683 | A * | 6/2019 | ............. | H01G 4/012 |

* cited by examiner

FIRST
DIRECTION

THIRD
DIRECTION

FIRST
DIRECTION

SECOND
DIRECTION

THIRD
DIRECTION

MULTILAYER ELECTRONIC COMPONENT

CROSS-REFERENCE TO RELATED APPLICATION (S)

This application claims benefit of priority to Korean Patent Application No. 10-2022-0174996 filed on Dec. 14, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, may be a chip-type condenser which is mounted on a printed circuit board of various electronic products, such as an imaging device such as a liquid crystal display (LCD) or a plasma display panel (PDP), a computer, a smartphone or a cellular phone, to charge or discharge electricity therein or therefrom.

Recently, an attempt has been made to improve a stacking degree of the internal electrodes in accordance with the smaller size and higher integration of a multilayer ceramic capacitor. However, a step difference may occur in a region of a dielectric layer where the internal electrode is not formed due to a difference between the thickness and stacking degree of the internal electrodes and those of the dielectric layers. The step difference may cause the dielectric layer and the internal electrode to be bent, which may result in a defect such as delaminated sheets.

As a method to suppress the step difference, an attempt has been made to form a step difference compensation part by inserting a step difference compensation sheet into a margin portion where no internal electrode is formed. However, a break down voltage (BDV) characteristic may be deteriorated due to a difference in grain density, an average grain size, and the like in the internal electrode and those in the step difference compensation part.

Therefore, it is necessary to improve a microstructure of the margin portion that may enhance a break down voltage (BDV) characteristic while offsetting the step difference between the dielectric layer and the internal electrode.

SUMMARY

An aspect of the present disclosure may provide a multilayer electronic component which may suppress deterioration of a break down voltage (BDV) characteristic that may occur when a step difference compensation part is formed on a margin portion to offset a step difference occurring due to a difference in stacking degrees of dielectric layers and internal electrodes.

However, the present disclosure is not limited to the description above, and may be more readily understood in the description of exemplary embodiments of the present disclosure.

According to an aspect of the present disclosure, a multilayer electronic component may include: a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a dielectric layer and first and second internal electrodes alternately disposed in the first direction while having the dielectric layer interposed therebetween; and external electrodes respectively disposed on the third and fourth surfaces. The body may include a capacitance formation portion in which the dielectric layer and first or second internal electrode overlap each other in the first direction, a first margin portion disposed on one surface or the other surface of the capacitance formation portion in the second direction, and a second margin portion disposed on one surface or the other surface of the capacitance formation portion in the third direction. A first region may be a region of the dielectric layer that is included in the capacitance formation portion and a second region may be a region of the dielectric layer that is included in the first margin portion. The first or second region may include manganese (Mn) and titanium (Ti). A ratio of a content of manganese (Mn) to a content of titanium (Ti) in the second region may be more than 1 time and 1.9 times or less compared to a ratio of a content of manganese (Mn) to a content of titanium (Ti) in the first region.

According to another aspect of the present disclosure, a multilayer electronic component may include: a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a dielectric layer and first and second internal electrodes alternately disposed in the first direction while having the dielectric layer interposed therebetween; and external electrodes disposed on the third and fourth surfaces. The body may include a capacitance formation portion in which the dielectric layer and first or second internal electrode overlap each other in the first direction, a first margin portion disposed on one surface or the other surface of the capacitance formation portion in the second direction, and a second margin portion disposed on one surface or the other surface of the capacitance formation portion in the third direction. A first region may be a region of the dielectric layer that is included in the capacitance formation portion and a second region may be a region of the dielectric layer that is included in the first margin portion. The first region or the second margin portion may include silicon (Si), dysprosium (Dy), or titanium (Ti). A ratio of a content of silicon (Si) to a content of titanium (Ti) in the second margin portion may be more than 1 time and 1.9 times or less compared to a ratio of a content of silicon (Si) to a content of titanium (Ti) in the first region. A ratio of a content of dysprosium (Dy) to the content of titanium (Ti) in the second margin portion may be more than 1 time and 1.9 times or less compared to a ratio of a content of dysprosium (Dy) to the content of titanium (Ti) in the first region.

According to another aspect of the present disclosure, a multilayer electronic component may include: a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a dielectric layer and first and second internal electrodes alternately disposed in the first direction while having the dielectric layer interposed therebetween; and external electrodes respectively disposed on the third and fourth surfaces. The body may include a capacitance formation portion in which the dielectric layer and first or second internal electrode overlap each other in the first direction, a first margin portion disposed on one surface or the other surface of the capacitance formation portion in the second direction, and a second margin portion disposed on one surface or the other surface of the capacitance formation portion in the third direction. A first region may be a region of the dielectric layer that is included in the capacitance formation portion and a second region may be a region of the dielectric layer that is included in the first margin portion. A ratio of a content of element R1 to a content of titanium (Ti) in the second region may be more than 1 time and 1.9 times or less compared to a ratio of a content of the element R1 to a content of titanium (Ti) in the first region.

The element R1 may be one selected from the group consisting of manganese (Mn) and dysprosium (Dy).

A ratio of a content of element R2 to a content of titanium (Ti) in the second margin portion may be more than 1 time and 1.9 times or less compared to a ratio of a content of the element R2 to the content of titanium (Ti) in the first region.

The element R2 may be one selected from the group consisting of silicon (Si) and dysprosium (Dy).

BRIEF DESCRIPTION OF DRAWINGS

The above and other aspects, features and advantages of the present disclosure will be more clearly understood from the following detailed description taken in conjunction with the accompanying drawings, in which:

FIGS. 4 through 9 show an example of a method of manufacturing a multilayer electronic component according to still another exemplary embodiment of the present disclosure;

DETAILED DESCRIPTION

Figure 1:
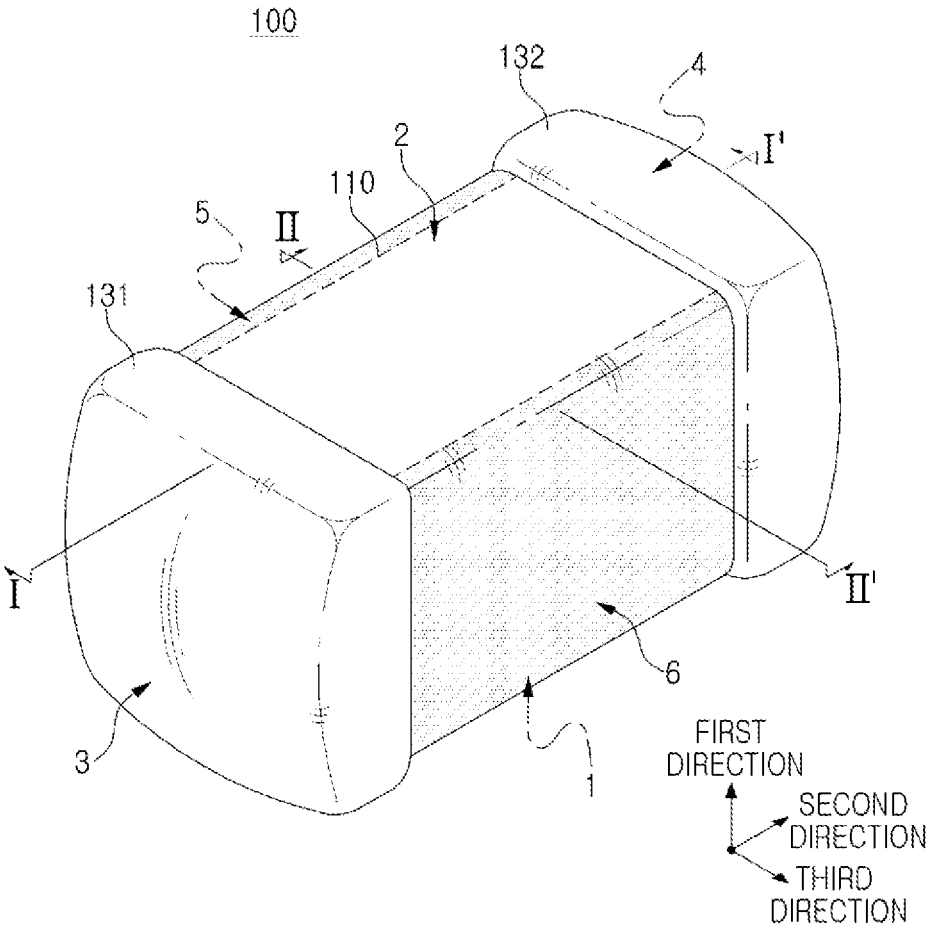
FIG. 1 is a perspective view showing a multilayer electronic component according to an exemplary embodiment and another exemplary embodiment of the present disclosure.

Hereinafter, exemplary embodiments of the present disclosure will now be described in detail with reference to the accompanying drawings.

In the drawings, a first direction be defined as a direction in which first and second internal electrodes are alternately disposed while having a dielectric layer interposed therebetween, or a thickness (T) direction, and a second direction may be defined as a length (L) direction, and a third direction may be defined as a width (W) direction, among the second direction and the third direction that are perpendicular to the first direction.

FIG. 1 is a perspective view showing a multilayer electronic component according to an exemplary embodiment and another exemplary embodiment of the present disclosure.

Figure 2:
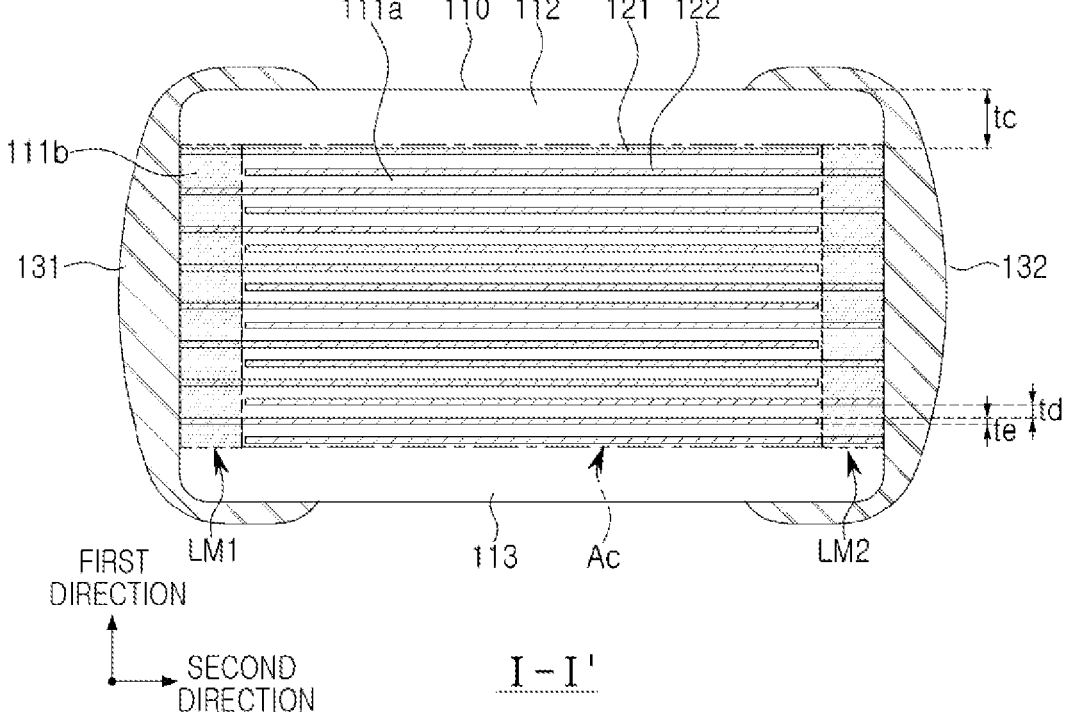
FIG. 2 is a cross-sectional view taken along line I-I' of FIG. 1.

FIG. 2 is a cross-sectional view taken along line I-I' of FIG. 1.

Figure 3:
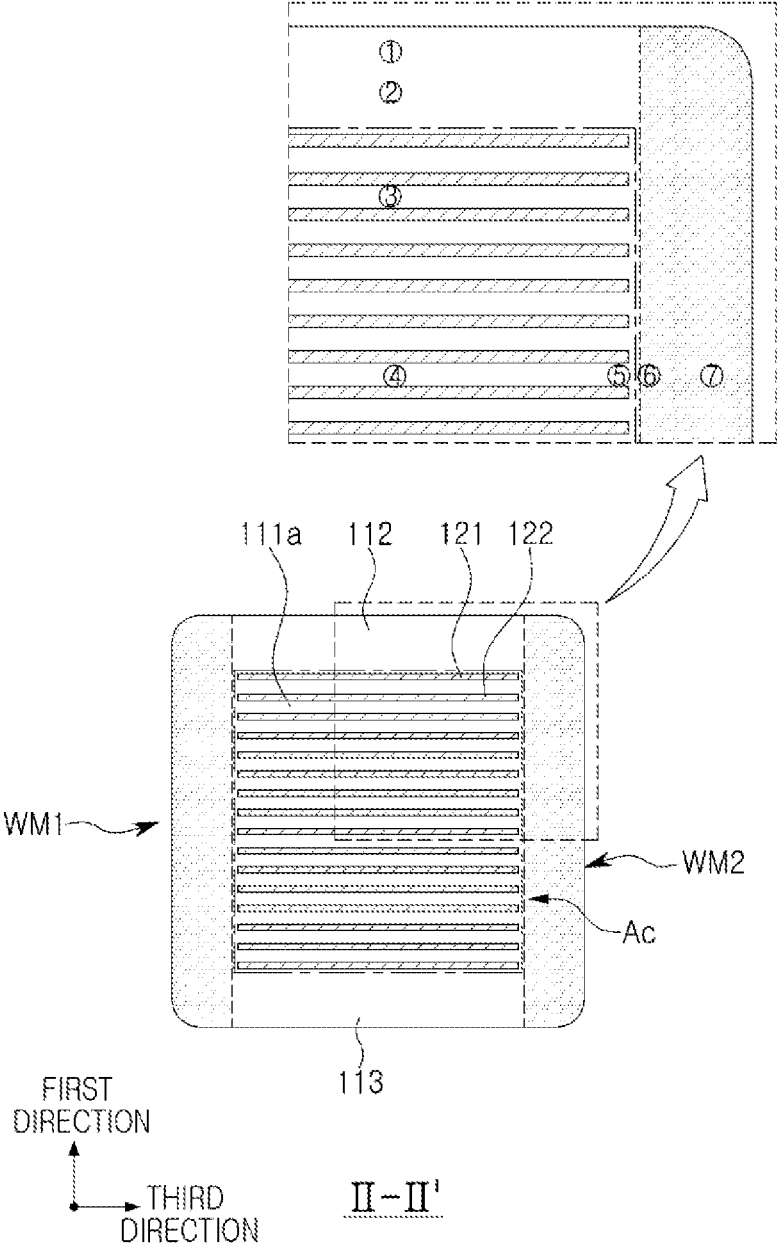
FIG. 3 is a cross-sectional view taken along line II-II' of FIG. 1.

FIG. 3 is a cross-sectional view taken along line II-II' of FIG. 1.

Figure 10:
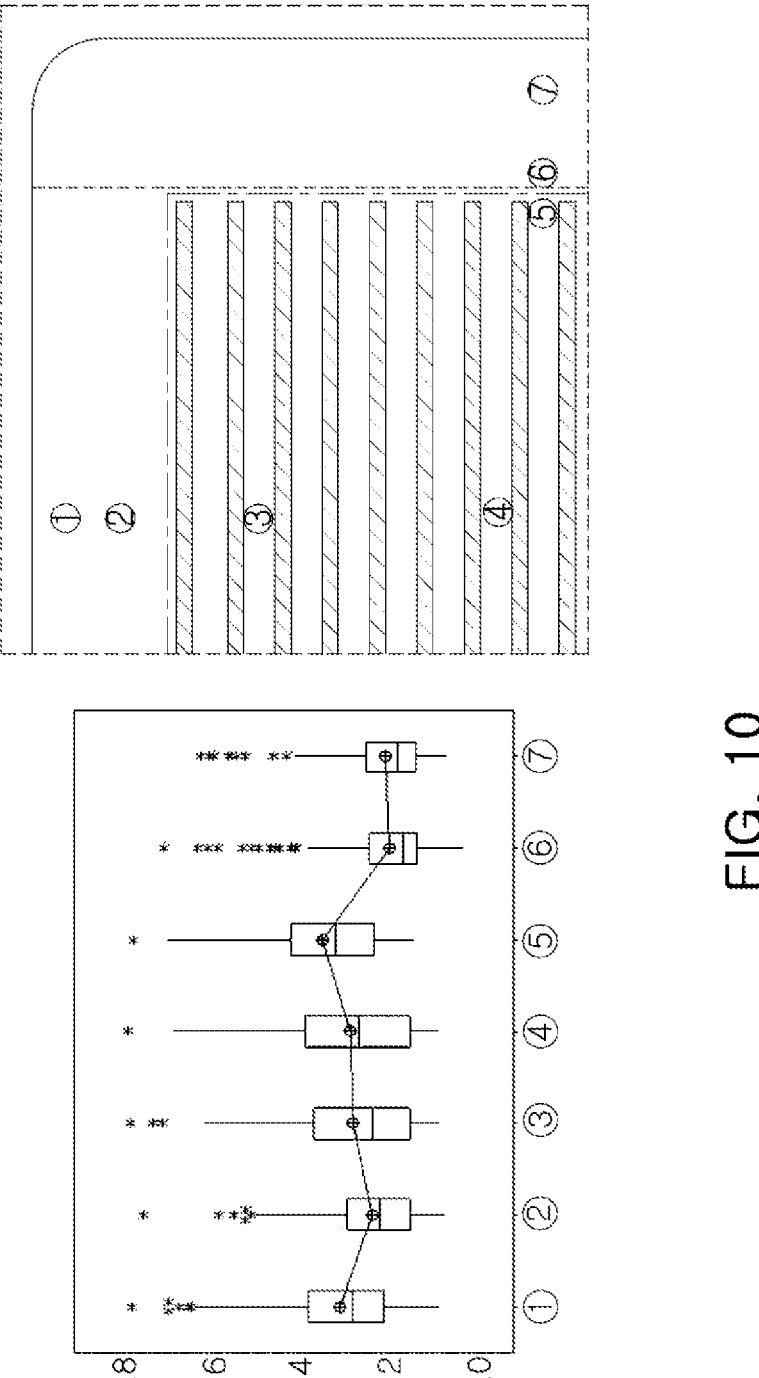
FIG. 10 shows a measured grain size based on a position of a dielectric layer in cross sections of a multilayer electronic component in a comparative example in first and third directions.

FIG. 10 shows a measured grain size based on its position in a dielectric layer based on cross sections of a multilayer electronic component in a comparative example in first and third directions.

Figure 11:
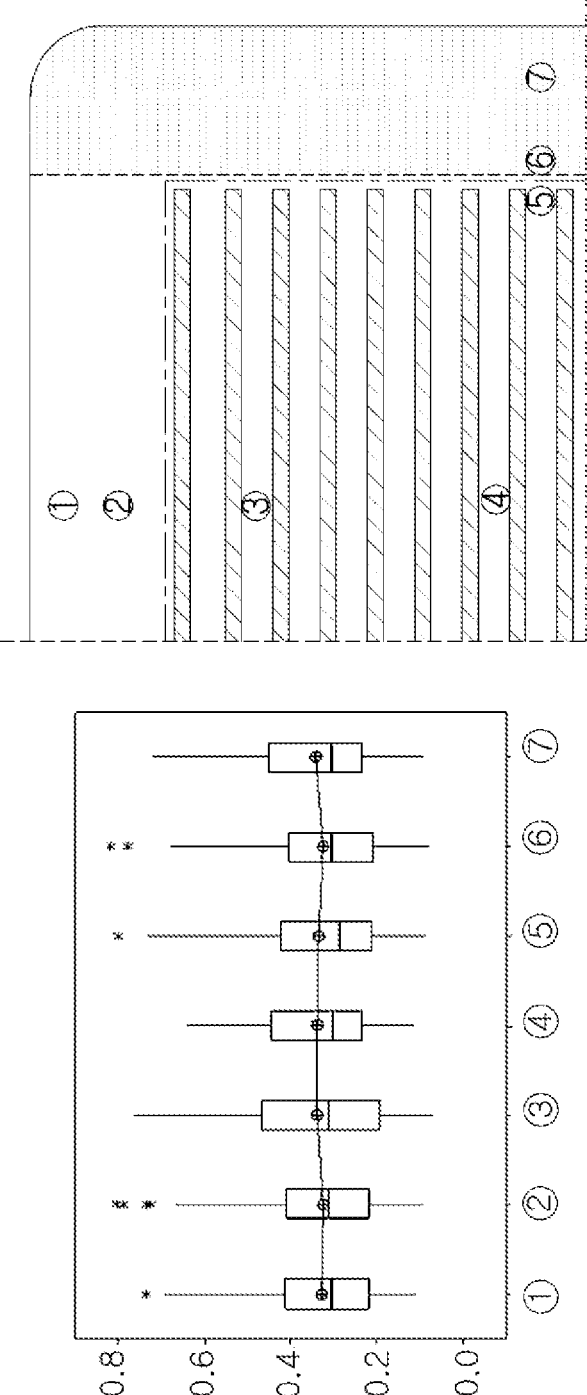
FIG. 11 shows a measured grain size based on a position of a dielectric layer in cross sections of the multilayer electronic component in an inventive example in first and third directions.

FIG. 11 shows a measured grain size based on its position in a dielectric layer based on cross sections of the multilayer electronic component in an inventive example in first and third directions.

Hereinafter, the description describes a multilayer electronic component 100 according to an exemplary embodiment of the present disclosure in detail with reference to FIGS. 1 through 3, 10 and 11.

According to an exemplary embodiment of the present disclosure, the multilayer electronic component 100 may include: a body 110 having first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1 to 4 and opposing each other in the third direction, and including a dielectric layer 111 and first and second internal electrodes 121 and 122 alternately disposed in a first direction while having the dielectric layer 111 interposed therebetween; and external electrodes 131 and 132 disposed on the third and fourth surfaces 3 and 4. The body may include a capacitance formation portion Ac in which the dielectric layer and first or second internal electrode overlap each other in the first direction, a first margin portion LM1 or LM2 disposed on one surface or the other surface of the capacitance formation portion Ac in the second direction, and a second margin portion WM1 or WM2 disposed on one surface or the other surface of the capacitance formation portion Ac in the third direction, and when a first region 111*a* is a region of the dielectric layer 111 that is included in the capacitance formation portion Ac and a second region 111*b* is a region of the dielectric layer 111 that is included in the first margin portion LM1 or LM2, the first or second region may include manganese (Mn) and titanium (Ti), and a ratio of a content of manganese (Mn) to a content of titanium (Ti) in the second region 111*b* may be more than 1 time and 1.9 times or less compared to the ratio of the content of manganese (Mn) to the content of titanium (Ti) in the first region 111*a*.

Referring to FIG. 2, the body 110 may include the dielectric layer 111 and the first and second internal electrodes 121 and 122 alternately disposed in the first direction while having the dielectric layer 111 interposed therebetween.

The body 110 may include the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first to fourth surfaces 1 to 4 and opposing each other in the third direction.

The body 110 is not limited to a particular shape, and may have a hexahedral shape or a shape similar to the hexahedral shape, as shown in the drawings. The body 110 may not have the hexahedral shape having perfectly straight lines due to contraction of ceramic powders included in the body 110 in a sintering process, and have substantially the hexahedral shape.

The plurality of dielectric layers 111 included in the body 110 may be in a sintered state, and adjacent dielectric layers 111 may be integrated with each other so that boundaries therebetween are not readily apparent without using a scanning electron microscope (SEM).

A main element included in a raw material of the dielectric layer 111 is not particularly limited. The raw material of the dielectric layer is not particularly limited as long as sufficient capacitance is obtained from the raw material. For example, the dielectric layer 111 may use a material such as a barium titanate-based material, a lead composite perovskite-based material, a strontium titanate-based material, or the like. The barium titanate-based material may include barium titanate ($BaTiO_3$)-based ceramic powders, and the ceramic powders may be, for example, $BaTiO_3$ or $(Ba_{1-x}Ca_x)$ $TiO_3$ ($0<x<1$), $Ba(Ti_{1-y}Ca_y)O_3$ ($0<y<1$), $(Ba_{1-x}Ca_x)$ $(Ti_{1-y}Zr_y)O_3$ ($0<x<1, 0<y<1$) or $Ba(Ti_{1-y}Zr_y)O_3$ ($0<y<1$), in which calcium (Ca), zirconium (Zr) or the like is partially dissolved in $BaTiO_3$.

Meanwhile, an average thickness td of the dielectric layer 111 may not need to be particularly limited. For example, the average thickness td of the dielectric layer 111 may be 0.35 μm or less.

Here, the thickness td of the dielectric layer 111 may indicate the average thickness td of the dielectric layer 111 disposed between the first and second internal electrodes 121 and 122.

The average thickness td of the dielectric layer 111 may be measured by scanning an image of a cross section of the body 110 in a length-thickness (L-T) direction by using the scanning electron microscope (SEM) with a magnification of 10,000. In more detail, an average thickness value of the dielectric layer may be measured by measuring a thickness of one dielectric layer at thirty equally spaced points in the length direction in the scanned image. The thirty equally spaced points may be designated in the capacitance formation portion Ac. In addition, it is possible to obtain the more general average thickness of the dielectric layer when measuring its average value by extending a measurement target of the average value to ten dielectric layers.

In an exemplary embodiment, an upper cover portion 112 may be disposed on one surface of the capacitance formation portion Ac in the first direction, and a lower cover portion 113 may be disposed on the other surface of the capacitance formation portion Ac in the first direction.

The upper cover portion 112 and the lower cover portion 113 may respectively be formed by stacking one dielectric layer or two or more dielectric layers on the upper and lower surfaces of the capacitance formation portion Ac in the thickness direction, and may basically prevent the internal electrodes from being damaged due to physical or chemical stress.

The upper or lower cover portion 112 or 113 may include no internal electrode and include the same material as the dielectric layer 111.

That is, the upper or lower cover portion 112 or 113 may include a ceramic material and include, for example, a barium titanate ($BaTiO_3$)-based ceramic material.

Meanwhile, an average thickness of the cover portion 112 or 113 may not need to be particularly limited. However, 15 μm or less may be an average thickness tc of the cover portion 112 or 113 in order for the multilayer electronic component to more easily have a smaller size and a higher capacitance.

The average thickness of the cover portion 112 or 113 may indicate its size in the first direction, and may have a value obtained by averaging the sizes of the cover portion 112 or

113 in the first direction, measured at five equally spaced points on upper or lower surface of the capacitance formation portion Ac.

The internal electrodes 121 and 122 may be alternately disposed while having the dielectric layer 111 therebetween. The internal electrode 121 or 122 may be the first internal electrode 121 or the second internal electrode 122. The first and second internal electrodes 121 and 122 may be alternately disposed to oppose each other while having the dielectric layer 111 included in the body 110 interposed therebetween, and may respectively be connected to the third and fourth surfaces 3 and 4 of the body 110.

Referring to FIG. 2, the first internal electrode 121 may be spaced apart from the fourth surface 4 and exposed to (or be in contact with or extend from) the third surface 3, and the second internal electrode 122 may be spaced apart from the third surface 3 and exposed to (or be in contact with or extend from) the fourth surface 4.

Here, the first and second internal electrodes 121 and 122 may be electrically isolated from each other by the dielectric layer 111 interposed therebetween.

Referring to FIG. 3, the body 110 may be formed by alternately stacking a ceramic green sheet on which the first internal electrode 121 is printed and a ceramic green sheet on which the second internal electrode 122 is printed on each other and then sintering the same.

A material of the internal electrode 121 or 122 is not particularly limited, and may use a material having excellent electrical conductivity. For example, the internal electrode 121 or 122 may include at least one of nickel (Ni), copper (Cu), palladium (Pd), silver (Ag), gold (Au), platinum (Pt), tin (Sn), tungsten (W), titanium (Ti), and an alloy thereof.

In addition, the internal electrode 121 or 122 may be formed by printing, on the ceramic green sheet, a conductive paste for an internal electrode including at least one of nickel (Ni), copper (Cu), palladium (Pd), silver (Ag), gold (Au), platinum (Pt), tin (Sn), tungsten (W), titanium (Ti), and an alloy thereof. A method of printing the conductive paste for an internal electrode may be a screen printing method, a gravure printing method or the like, and the present disclosure is not limited thereto.

Meanwhile, an average thickness te of the internal electrode 121 or 122 may not need to be particularly limited. However, the thickness of the internal electrode may be 0.35 μm or less for the multilayer electronic component 100 to have the smaller size and the higher capacitance.

The average thickness of the internal electrode 121 or 122 may be measured by scanning an image of the cross section of the body 110 in the length-thickness (L-T) direction by using the scanning electron microscope (SEM) with a magnification of 10,000. In more detail, an average thickness value of the internal electrode may be measured by measuring a thickness of one the internal electrode at thirty equally spaced points in the length direction in the scanned image. The thirty equally spaced points may be designated in the capacitance formation portion Ac. In addition, it is possible to obtain the more general average thickness of the internal electrode when measuring its average value by extending a measurement target of the average value to ten internal electrodes.

The external electrode 131 or 132 may be disposed on the third surface 3 or the fourth surface of the body 110. The external electrodes 131 and 132 may be the first and second external electrodes 131 and 132 respectively disposed on the third and fourth surfaces 3 and 4 of the body 110, and respectively connected to the first and second internal electrodes 121 and 122.

This exemplary embodiment describes that the multilayer electronic component 100 includes two external electrodes 131 and 132. However, the number, shape or the like of the external electrode 131 or 132 may depend on a shape of the internal electrode 121 or 122 or another purpose.

Meanwhile, the external electrode 131 or 132 may be made of any material having electrical conductivity, such as a metal, may use a specific material determined in consideration of electrical characteristics, structural stability or the like, and may have a multilayer structure.

For example, the external electrode 131 or 132 may include an electrode layer disposed on the body 110 and a plating layer formed on the electrode layer.

For a more specific example of the electrode layer, the electrode layer may be a fired electrode including a conductive metal and glass or a resin-based electrode including the conductive metal and the resin.

In addition, the electrode layer may have the fired electrode and the resin-based electrode, sequentially formed on the body. Alternatively, the electrode layer may be formed by transferring a sheet including the conductive metal to the body or by transferring the sheet including the conductive metal to the fired electrode.

The conductive metal included in the electrode layer may use the material having the excellent electrical conductivity, and is not particularly limited. For example, the conductive metal may be at least one of nickel (Ni), copper (Cu), and an alloy thereof.

The plating layer may improve a mounting characteristic of the multilayer electronic component. The plating layer is not limited to a particular type, may include at least one of nickel (Ni), tin (Sn), palladium (Pd) and an alloy thereof, or may include a plurality of layers.

For a more specific example of the plating layer, the plating layer may be a nickel (Ni) plating layer or a tin (Sn) plating layer, may have the nickel (Ni) plating layer and the tin (Sn) plating layer, sequentially formed on the electrode layer, or the tin (Sn) plating layer, the nickel (Ni) plating layer, and the tin (Sn) plating layer, sequentially formed on the electrode layer. In addition, the plating layer may include the plurality of Ni plating layers or the plurality of Sn plating layers. The external electrode 131 or 132 may be disposed.

The body 110 according to an exemplary embodiment of the present disclosure may include the capacitance formation portion Ac in which the dielectric layer 111 and first and second internal electrodes 121 and 122 overlap each other in the first direction, the first margin portion LM1 or LM2 disposed on one surface or the other surface of the capacitance formation portion Ac in the second direction, and the second margin portion WM1 or WM2 disposed on one surface and the other surface of the capacitance formation portion in the third direction.

The capacitance formation portion Ac may be a region where the dielectric layer 111 and the first and second internal electrodes 121 and 122 overlap each other in the first direction, and here, the first region 111a may indicate the region of the dielectric layer 111. The capacitance formation portion Ac may be the region where the first and second internal electrodes 121 and 122 overlap the first region 111a in the first direction, thus forming a capacitance of the multilayer electronic component 100.

The first margin portion LM1 or LM2 may be the region disposed on one surface and the other surface of the capacitance formation portion Ac in the second direction, and here, the second region 111b may indicate the region of the dielectric layer 111 that is included in the first margin portion LM1 or LM2. The first margin portion LM1 or LM2 may be a section formed by the internal electrode 121 or 122 extending from the capacitance formation portion in the second direction, electrically connect the body 110 with the external electrode 131 or 132, and protect the capacitance formation portion Ac from external physical or chemical stress by making it difficult for moisture that may permeate into a junction of the body 110 and the external electrode 131 or 132 to directly reach the capacitance formation portion Ac, etc. In addition, the first margin portion LM1 or LM2 may include the second region 111b of the dielectric layer, thereby offsetting a step difference due to a difference in stacking degrees of the internal electrodes included in the first margin portion LM1 or LM2 and those of the internal electrodes included in capacitance formation portion Ac. The first margin portion LM1 or LM2 may be formed by positioning a separate ceramic sheet in a space between the first internal electrode 121 and the fourth surface 4 or between the second internal electrode 122 and the third surface 3 when the conductive paste is applied to the ceramic green sheet so that the first internal electrode is exposed on the third surface 3 of the body 110 and the second internal electrode is exposed on the fourth surface 4 of the body.

The second margin portion WM1 or WM2 may indicate the region of the capacitance formation portion Ac that is disposed on one surface or the other surface in the third direction. The second margin portion WM1 or WM2 may be formed by forming the internal electrode by applying the conductive paste on the ceramic green sheet except for its portion where the margin portion is to be formed. In addition, in order to suppress the step difference due to the internal electrode 121 or 122, the second margin portion WM1 or WM2 may be formed by stacking the internal electrodes on each other, then cutting the internal electrodes to be exposed to the fifth and sixth surfaces 5 and 6 of the body, and then stacking one dielectric layer or two or more dielectric layers on each of two side surfaces of the capacitance formation portion Ac in the third direction (or width direction). Meanwhile, a width of the second margin portion WM1 or WM2 may not need to be particularly limited. However, 15 μm or less may be an average width of the second margin portion WM1 or WM2 in order for the multilayer electronic component to more easily have the smaller size and the higher capacitance.

The average width of the second margin portion WM1 or WM2 may indicate its average size in the third direction, and may have a value obtained by averaging the sizes of the second margin portions WM1 or WM2 in the third direction, measured at five equally spaced points on the side surface of the capacitance formation portion Ac.

According to an exemplary embodiment of the present disclosure, the first or second region 111a or 111b may include manganese (Mn) and titanium (Ti). Titanium (Ti) may be included in the barium titanate-based material, which is the raw material of the dielectric layer 111, and manganese (Mn) may be included in an additive added for promoted sintering of the dielectric layer 111 including manganese (Mn), an enhanced withstand voltage, and the like.

The second region 111b may be the dielectric layer included in the first margin portion LM1 or LM2, and may offset the step difference between the capacitance formation portion Ac and the first margin portion LM1 or LM2. The prior art may have a lower effect of offsetting the step difference because fine gaps of the internal electrode 121 or 122 in the first margin portion LM1 or LM2 and those of the second region 111b overlap each other to cause increased grain size dispersion or decreased grain density, which may cause the multilayer electronic component to have a deteriorated break down voltage (BDV) characteristic.

An exemplary embodiment of the present disclosure aims to improve a break down voltage (BDV) characteristic of the multilayer electronic component 100 by adjusting a ratio of a content of an element included in the first or second region 111a or 111b of the dielectric layer 111 to thus reduce a difference in a dielectric grain size dispersion or dielectric grain density in the first region 111a and that in the second region 111b.

In detail, in an exemplary embodiment of the present disclosure, the ratio of the content of manganese (Mn) to the content of titanium (Ti) in the second region 111b may be more than 1 time and 1.9 times or less compared to the ratio of the content of manganese (Mn) to the content of titanium (Ti) in the first region 111a.

The second region 111b and the first region 111a may have a gradually decreased difference in the grain size dispersion or the grain density when the ratio of the content of manganese (Mn) to the content of titanium (Ti) in the second region 111b is greater than the ratio of the content of manganese (Mn) to the content of titanium (Ti) in the first region 111a. Accordingly, the multilayer electronic component 100 may have an improved break down voltage (BDV) characteristic. Meanwhile, it is impossible to sufficiently reduce the difference in the dielectric grain size dispersion or the dielectric grain density, thus deteriorating the break down voltage (BDV) characteristic of the multilayer electronic component 100 when the ratio of the content of manganese (Mn) to the content of titanium (Ti) in the second region 111b is more than 1.9 times compared to the ratio of the content of manganese (Mn) to the content of titanium (Ti) in the first region 111a. In addition, the multilayer electronic component 100 may have the deteriorated break down voltage (BDV) characteristic when the ratio of the content of manganese (Mn) to the content of titanium (Ti) in the second region 111b is more than 1.9 times compared to the ratio of the content of manganese (Mn) to the content of titanium (Ti) in the first region 111a, manganese (Mn) may be is diffused into the first region 111a of the dielectric layer 111 that is included in the capacitance formation portion Ac. Therefore, as in an exemplary embodiment of the present disclosure, the multilayer electronic component 100 may have the improved break down voltage (BDV) characteristic when the ratio of the content of manganese (Mn) to the content of titanium (Ti) in the second region 111b is more than 1 time and 1.9 times or less compared to the ratio of the content of manganese (Mn) to the content of titanium (Ti) in the first region 111a.

In an exemplary embodiment, the first region 111a may further include silicon (Si), the second margin portion WM1 or WM2 may include silicon (Si) and titanium (Ti), and a ratio of a content of silicon (Si) to the content of titanium (Ti) in the second margin portion WM1 or WM2 may be more than 1 time and 1.9 times or less compared to the ratio of the content of silicon (Si) to the content of titanium (Ti) in the first region 111a. Accordingly, it is possible to significantly improve down the break voltage (BDV) characteristic of the multilayer electronic component 100 by adjusting the ratio of the content of manganese (Mn) to the content of titanium (Ti) in the second region 111b to be more than 1 time and 1.9 times or less compared to the ratio of the content of manganese (Mn) to the content of titanium (Ti) in the first region 111a to thus reduce not only the difference in the dielectric grain size dispersion or the grain density in the second region 111b and that in the first region 111a, but also the difference in the dielectric grain size dispersion or the grain density in the second margin portion WM1 or WM2 and that in the first region 111a.

In an exemplary embodiment, the first or second region 111a or 111b may further include dysprosium (Dy), and a ratio of a content of dysprosium (Dy) to the content of titanium (Ti) in the second region 111b may be more than 1 time and 1.9 times or less compared to the ratio of the content of dysprosium (Dy) to the content of titanium (Ti) in the first region 111a. Accordingly, it is possible to further improve the break down voltage (BDV) characteristic of the multilayer electronic component 100 by reducing the difference in the dielectric grain size dispersion or the grain density in the second region 111b and that in the first region 111a.

In an exemplary embodiment, the first region 111a may further include dysprosium (Dy), the second margin portion WM1 or WM2 may include dysprosium (Dy) and titanium (Ti), and the ratio of the content of dysprosium (Dy) to the content of titanium (Ti) in the second margin portion WM1 or WM2 may be more than 1 time and 1.9 times or less compared to the ratio of the content of dysprosium (Dy) to the content of titanium (Ti) in the first region 111a. Accordingly, it is possible to further improve the break down voltage (BDV) characteristic of the multilayer electronic component 100 by reducing the difference in the dielectric grain size dispersion or the grain density in the second region 111b and that in the first region 111a.

In an exemplary embodiment, the second region 111b may further include at least one of barium (Ba), calcium (Ca), aluminum (Al), lithium (Li), sodium (Na), copper (Cu), and zinc (Zn), or the second margin portion WM1 or WM2 may further include at least one of barium (Ba), calcium (Ca), aluminum (Al), lithium (Li), sodium (Na), copper (Cu), and zinc (Zn). Accordingly, it is possible to further improve the grain density of the second region 111b.

In an exemplary embodiment, the second region 111b may further include at least one of holmium (Ho) and yttrium (Y), or the second margin portion WM1 or WM2 may further include at least one of holmium (Ho) and yttrium (Y). However, the present disclosure is not limited thereto, and the second region 111b or the second margin portion WM1 or WM2 can further include rare earth elements of the Lantanum. Accordingly, it is possible to improve the break down voltage (BDV) characteristic of the multilayer electronic component 100, and simultaneously improve high-temperature reliability thereof.

The multilayer electronic component 100 may not need to be limited to a particular size.

However, in order for the multilayer electronic component to have the smaller size and simultaneously have the higher capacitance, it is necessary to increase the number of stacks by allowing the dielectric layer and the internal electrode to each have a smaller thickness. The multilayer electronic component 100 having a size of 0603 (i.e., length×width of 0.6 mm×0.3 mm) or less may thus have more significantly improved reliability and breakdown voltage (BDV) characteristic according to the present disclosure.

Therefore, in consideration of a manufacturing error, a size of the external electrode and the like, when having a length of 0.66 mm or less and a width of 0.33 mm or less, the multilayer electronic component 100 may have the more significantly improved adhesion strength according to the present disclosure. Here, the length of the multilayer electronic component 100 may indicate a maximum size of the multilayer electronic component 100 in the second direction, and the width of the multilayer electronic component 100 may indicate a maximum size of the multilayer electronic component 100 in the third direction.

Hereinafter, the description describes a multilayer electronic component 100 according to another exemplary embodiment of the present disclosure in detail. The multilayer electronic component 100 according to another exemplary embodiment of the present disclosure has the same configuration as the multilayer electronic component 100 according to an exemplary embodiment except for a concentration distribution of a specific element in the first or second region 111a or 111b, that of the second margin portion WM1 or WM2 and effects thereof. Therefore, the description omits descriptions overlapping with that of the multilayer electronic component 100 according to an exemplary embodiment of the present disclosure. In addition, various examples of the multilayer electronic component 100 according to an exemplary embodiment of the present disclosure may also be equally applied to the multilayer electronic component 100 according to another exemplary embodiment of the present disclosure to be described below.

According to another exemplary embodiment of the present disclosure, the multilayer electronic component 100 may include: a body 110 having first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1 to 4 and opposing each other in the third direction, and including a dielectric layer 111 and first and second internal electrodes 121 and 122 alternately disposed while having the dielectric layer 111 interposed therebetween in a first direction; and external electrodes 131 and 132 disposed on the third and fourth surfaces 3 and 4. The body may include a capacitance formation portion Ac in which the dielectric layer 111 and first or second internal electrode 121 and 122 overlap each other in the first direction, a first margin portion LM1 or LM2 disposed on one surface or the other surface of the capacitance formation portion Ac in the second direction, and a second margin portion WM1 or WM2 disposed on one surface or the other surface of the capacitance formation portion Ac in the third direction, and when a first region 111a is a region of the dielectric layer that is included in the capacitance formation portion and a second region 111b is a region of the dielectric layer that is included in the first margin portion, the first region or the second margin portion may include silicon (Si), dysprosium (Dy), or titanium (Ti), and a ratio of a content of silicon (Si) to a content of titanium (Ti) in the second margin portion may be more than 1 time and 1.9 times or less compared to the ratio of the content of silicon (Si) to the content of titanium (Ti) in the first region, and the ratio of the content of dysprosium (Dy) to the content of titanium (Ti) in the second margin portion may be more than 1 time and 1.9 times or less compared to the ratio of the content of dysprosium (Dy) to the content of titanium (Ti) in the first region.

In the multilayer electronic component 100 according to another exemplary embodiment of the present disclosure, the first region 111a and the second margin portion WM1 or WM2 may include silicon (Si), dysprosium (Dy), titanium (Ti), the ratio of the content of silicon (Si) to the content of titanium (Ti) in the second margin portion WM1 or WM2 may be more than 1 time and 1.9 times or less compared to the ratio of the content of silicon (Si) to the content of titanium (Ti) in the first region 111a, and the ratio of the content of dysprosium (Dy) to the content of titanium (Ti) in the second region may be more than 1 time and 1.9 times or less compared to the ratio of the content of dysprosium (Dy) to the content of titanium (Ti) in the first region.

It is possible to further increase an effect of reducing a difference in dielectric grain size dispersion or grain density in the second margin portion WM1 or WM2 and that in the first region 111a when the ratio of the content of silicon (Si) to the content of titanium (Ti) in the second margin portion WM1 or WM2 is greater than the ratio of the content of silicon (Si) to the content of titanium (Ti) in the first region 111a, and the ratio of the content of dysprosium (Dy) to the content of titanium (Ti) in the second region is greater than the ratio of the content of dysprosium (Dy) to the content of titanium (Ti) in the first region. Accordingly, it is possible to further improve a break down voltage (BDV) characteristic of the multilayer electronic component 100. Meanwhile, it is impossible to sufficiently reduce the difference in the dielectric grain size dispersion or the dielectric grain density, thus deteriorating the break down voltage (BDV) characteristic of the multilayer electronic component 100 when the ratio of the content of silicon (Si) to the content of titanium (Ti) in the second margin portion WM1 or WM2 is more than 1.9 times compared to the ratio of the content of silicon (Si) to the content of titanium (Ti) in the first region 111a, or the ratio of the content of dysprosium (Dy) to the content of titanium (Ti) in the second region is more than 1.9 times compared to the ratio of the content of dysprosium (Dy) to the content of titanium (Ti) in the first region. Therefore, as in another exemplary embodiment of the present disclosure, it is possible to further improve the break down voltage (BDV) characteristic of the multilayer electronic component 100 when the ratio of the content of silicon (Si) to the content of titanium (Ti) in the second margin portion WM1 or WM2 is less than 1.9 times compared to the ratio of the content of silicon (Si) to the content of titanium (Ti) in the first region 111a, or the ratio of the content of dysprosium (Dy) to the content of titanium (Ti) in the second region is less than 1.9 times compared to the ratio of the content of dysprosium (Dy) to the content of titanium (Ti) in the first region.

In the multilayer electronic component 100 according to an exemplary embodiment, another exemplary embodiment, and various examples of the present disclosure, there is no particular limit to a method of measuring the ratio of the content of a specific element to the content of titanium (Ti), included in the first or second region 111a or 111b, or the second margin portion WM1 or WM2.

In the present disclosure, the "ratio of the content of a specific element to the content of titanium (Ti), included in the first or second region 111a or 111b, or the second margin portion WM1 or WM2" may be defined as the "ratio of a peak intensity of a corresponding element to a peak intensity of titanium (Ti)" in a peak intensity result of each element that is measured in each region by using a laser-inductively coupled plasma (ICP) or a transmission electron microscopy energy-dispersive X-ray (TEM-EDX). In the result measured by the laser-ICP or TEM-EDX, the ratio of the peak intensity of the corresponding element to the peak intensity of titanium (Ti) may be obtained by polishing the multilayer electronic component 100 to its center in the first direction to expose its cross sections (or LW sections) in second and third directions, and then performing the measurement at a 15 μm×15 μm region of each center of any first region, the second region 111a or 111b, and the second margin portion WM1 or WM2. Here, it is possible to obtain the more general ratio when measuring its average value at any three or more points at the 15 μm×15 μm region.

FIGS. 4 through 9 show an example of a method of manufacturing a multilayer electronic component according to still another exemplary embodiment of the present disclosure.

Figure 4:
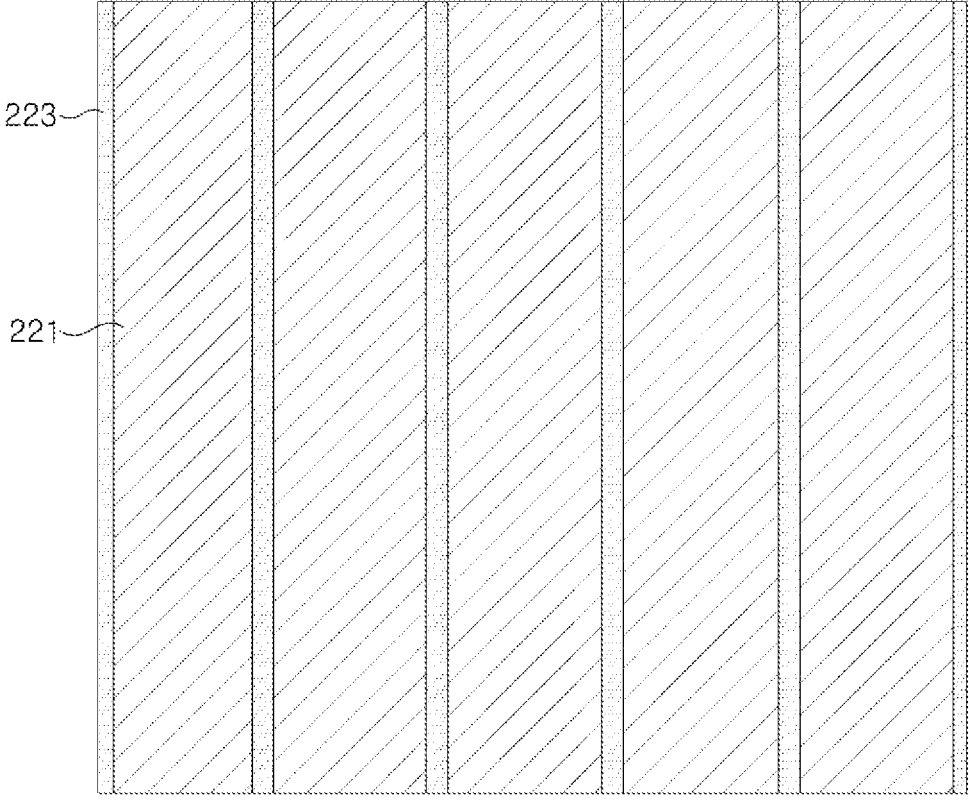
Figure 5:
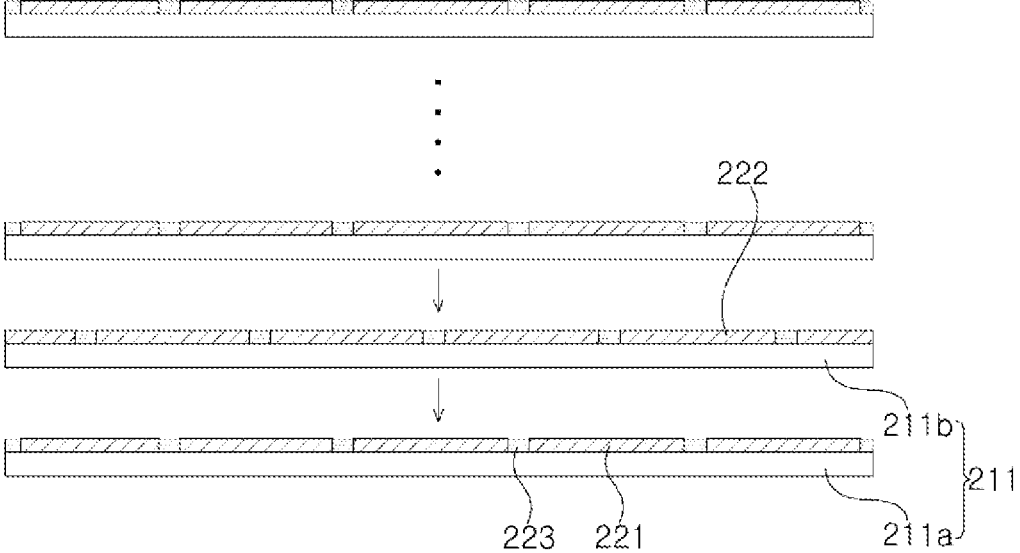

As shown in FIGS. 4 and 5, a plurality of first internal electrode patterns 221 may be formed at predetermined intervals on a ceramic green sheet 211. The plurality of first internal electrode patterns 221 may each be a stripe type, and may be parallel to each other.

A step difference compensation pattern 223 may be disposed in a space where the plurality of first internal electrode patterns 221 are spaced apart from each other at the predetermined intervals.

The ceramic green sheet 211 and the step difference compensation pattern 223 may each be formed of a ceramic paste including ceramic powders, an organic solvent, and an organic binder. The ceramic powders may be, for example, $BaTiO_3$ or $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, or $Ba(Ti_{1-y}Zr_y)O_3$ $(0<y<1)$, in which calcium (Ca), zirconium (Zr), or the like is partially dissolved in $BaTiO_3$. Different additives may be added to the ceramic green sheet 211 and the step difference compensation pattern 223, and a content of an element may be different even when the same additives are included therein. In still another exemplary embodiment of the present disclosure, it is possible to improve a break down voltage (BDV) characteristic of a multilayer electronic component 100 by changing a content of at least one of manganese (Mn), dysprosium (Dy), and silicon (Si) to a content of titanium (Ti), included in the ceramic green sheet 211 or that in the step difference compensation pattern 223. The ceramic green sheet 211 may be sintered to form a first region of a dielectric layer 111 of the present disclosure, and the step difference compensation pattern 223 may be sintered and diffused to the ceramic green sheet 211 to thus form a second region 111*b* of the dielectric layer 111.

The first internal electrode pattern 221 may be formed by an internal electrode paste including a conductive metal. The conductive metal is not particularly limited, and may be at least one of nickel (Ni), copper (Cu), palladium (Pd), silver (Ag), gold (Au), platinum (Pt), tin (Sn), tungsten (W), titanium (Ti), and an alloy thereof.

A method of forming the first internal electrode patterns 221 on the ceramic green sheet 211 is not particularly limited, and may be a printing method such as a screen printing method or a gravure printing method.

In addition, a plurality of second internal electrode patterns 222 may be formed on another ceramic green sheet 211 at predetermined intervals. The plurality of second internal electrode patterns 222 may each be a stripe type, and may be parallel to each other. Similarly, the step difference compensation pattern 223 may be disposed in a space where the plurality of second internal electrode patterns 222 are spaced apart from each other at the predetermined intervals.

A first ceramic green sheet 221*a* may indicate the ceramic green sheet on which the first internal electrode pattern 221 is formed, and a second ceramic green sheet 221*b* may indicate the ceramic green sheet on which the second internal electrode pattern 222 is formed.

Next, as shown in FIG. 5, the first and second ceramic green sheets 221*a* and 221*b* may be alternately stacked on each other so that the first internal electrode pattern 221 and the second internal electrode pattern 222 are alternately stacked on each other. Then, the first internal electrode pattern 221 may become the first internal electrode 121, and the second internal electrode pattern 222 may become the second internal electrode 122.

Figure 6:
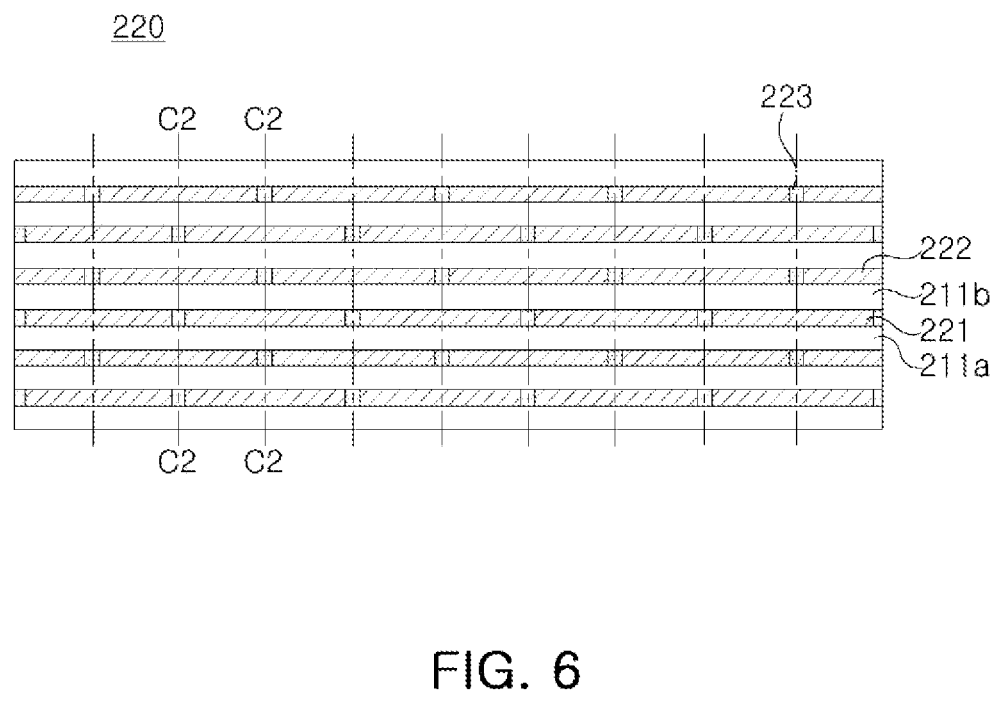

As shown in FIG. 6, a ceramic green sheet stack 220 in which the first and second ceramic green sheets are stacked on each other may be formed.

Referring to FIG. 6, the first ceramic green sheet 211*a* on which the plurality of first internal electrode patterns 221, parallel to each other, are printed and the second ceramic green sheet 211*b* on which the plurality of second internal electrode patterns 222, parallel to each other, may be alternately stacked on each other. In more detail, the ceramic green sheets may be stacked on each other to have an overlapping interval between a center of the stripe-type first internal electrode pattern 221 printed on the first ceramic green sheet 211*a* and the stripe-type second internal electrode pattern 222 printed on the second ceramic green sheet 211*b*, and the step difference compensation pattern 223 may be disposed in a space forming the interval.

Figure 7:
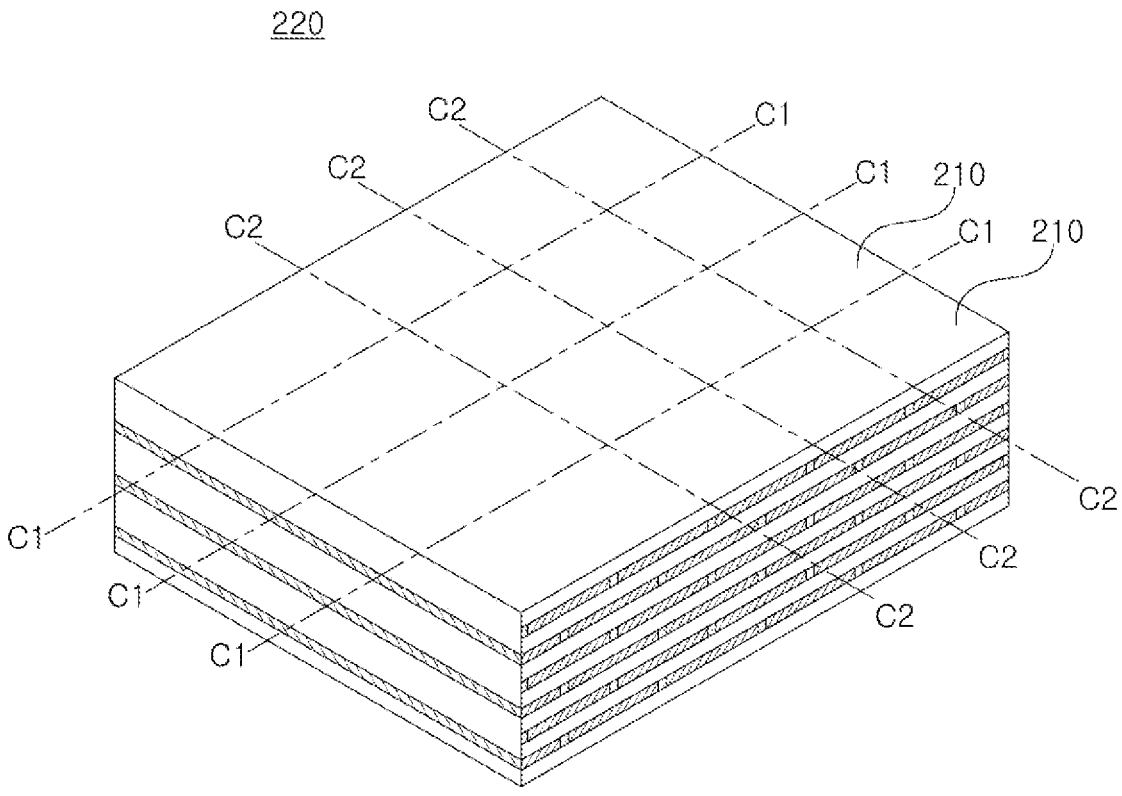

As shown in FIG. 7, the green sheet stack 220 may be cut across the plurality of stripe-type first internal electrode patterns 221 and the plurality of stripe-type second internal electrode patterns 222. That is, the ceramic green sheet stack 220 may be cut along cut lines C1-C1 and C2-C2 orthogonal to each other to become multilayer bodies 210.

In more detail, the stripe-type first internal electrode pattern 221 and the stripe-type second internal electrode pattern 222 may be cut in the length direction to be divided into a plurality of internal electrodes each having a predetermined width. Here, the stacked ceramic green sheets may also be cut together with the internal electrode patterns. Therefore, the dielectric layers may be formed to have the same width as that of the internal electrodes.

In addition, the ceramic green sheets may be cut at individual body sizes along the cut lines C2-C2. That is, the bar-type stack may be cut at the individual body sizes along the cut lines C2-C2 to form the plurality of multilayer bodies 210 before the first or second side marginal port is formed. Meanwhile, the step difference compensation pattern 223 may be cut along the cut lines C2-C2.

That is, the bar-shaped stack may be cut to cut the predetermined interval formed between the overlapping center of the first internal electrode and the second internal electrode by the same cutting line. Accordingly, one end of the first internal electrode and one end of the second internal electrode may be alternately exposed to a cut surface.

The method of cutting the green sheet stack 220 is not particularly limited. For example, the method may be a guillotine method in which the green sheet stack is cut by using a blade or a dicing method in which the green sheet stack is cut by rotating a dicing blade.

Figure 8:
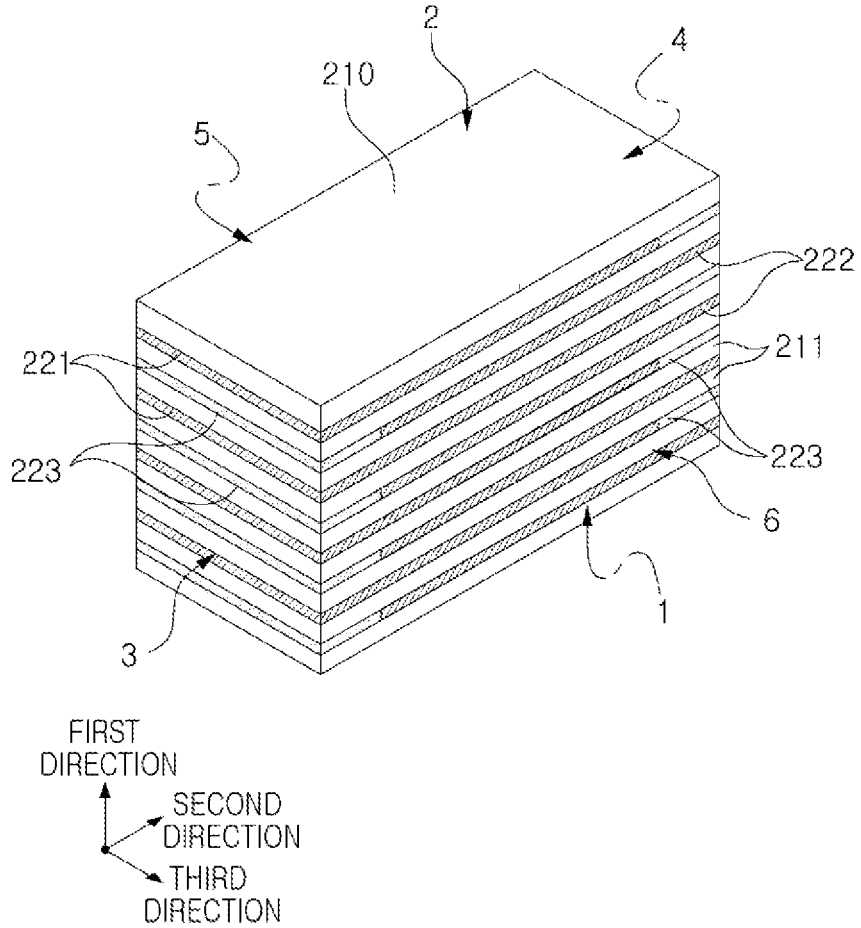

Referring to FIG. 8, the multilayer body 210 may have first and second surfaces 1 and 2 opposing each other in the first direction, third and fourth surfaces 3 and 4 opposing each other in the second direction, and fifth and sixth surfaces 5 and 6 opposing each other in the third direction, and the first internal electrode pattern 221 may be exposed to the third, fifth and sixth surfaces 3, 5, and 6, and the second internal electrode pattern 222 may be exposed to the fourth, fifth and sixth surfaces 4, 5, and 6. The fifth and sixth surfaces 5 and 6 may be end surfaces of the multilayer body to which the ends of the first internal electrode pattern 221 and the second internal electrode pattern 222 are exposed in the width direction.

Figure 9:
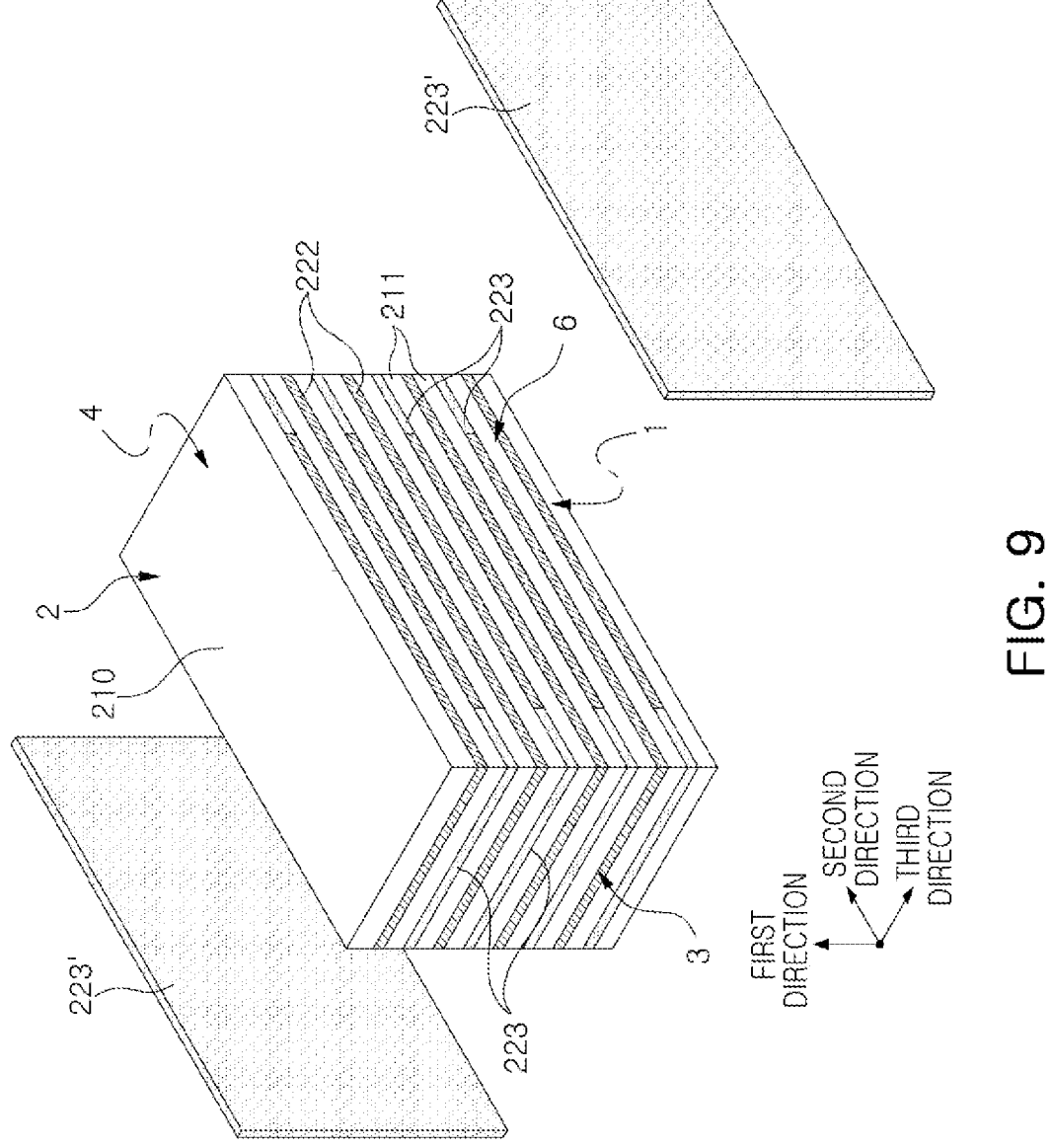

Referring to FIG. 9, ceramic green sheets 223' for the second margin portion may be disposed on the fifth and sixth surfaces 5 and 6 which are the end surfaces to which the ends of the first and second internal electrode patterns 221 and 222 are exposed in the width direction. The ceramic green sheet 223' for the second margin portion may be formed of a ceramic paste including the ceramic powders, the organic solvent, and the organic binder. The ceramic powders may be, for example, $BaTiO_3$ or $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), or $Ba(Ti_{1-y}Zr_y)O_3$ (0<y<1), in which calcium (Ca), zirconium (Zr), or the like is partially dissolved in $BaTiO_3$. Different additives may be added to the ceramic green sheet 211 and the step difference compensation pattern 223 and ceramic green sheet 223' for the second margin portion, and the content of an element may be different even when the same additives are included therein. The ceramic green sheet 223' for the second margin portion may be sintered to form the second margin portion WM1 or WM2.

Next, the body 110 according to still another exemplary embodiment of the present disclosure may be formed by sintering the multilayer body 210 to which the ceramic green sheet 223' for the second margin portion is attached.

Each external electrode 131 or 132 may be formed on the third surface 3 of the body 110 to which the first internal electrode 121 is exposed or the fourth surface 4 of the body 110 to which the second internal electrode 122 is exposed, and the structure and element of the external electrode are the same as described in the descriptions of the multilayer electronic component according to an exemplary embodiment, another exemplary embodiment, and various examples of the present disclosure.

Experimental Example

Table 1 below shows a dielectric grain size, grain density, and a value of the break down voltage (BDV), measured in the second region and second margin portion after the sintering is performed thereon by varying a ratio of specific elements.

The ratio of the elements shown in Table 1 below is expressed as a ratio of a value of the corresponding element/a value of an element titanium (Ti) in each region compared to the ratio of the value of the corresponding element/the value of the element titanium (Ti) in the first region 111a. Each value of each element is measured using the laser-ICP or TEM-EDX. In detail, the contents of manganese (Mn) and dysprosium (Dy) are measured by the laser-ICP, and the content of silicon (Si) is measured by the TEM-EDX to minimize measurement errors.

The "ratio of the content of the corresponding element to the content of Ti" in each region may be defined as the ratio of the peak intensity of the corresponding element to the peak intensity of titanium (Ti) in the results measured by the laser-ICP or the TEM-EDX. In the results measured by the laser-ICP or TEM-EDX, the ratio of the peak intensity of the corresponding element to the peak intensity of the titanium (Ti) is obtained by polishing the multilayer electronic component 100 to its center in the first direction to expose the cross sections (or LW sections) in the second and third directions, and then performing the measurement at a 15 μm×15 μm region of the center of each region. The ratio is its average value measured at any three or more points at the 15 μm×15 μm region.

In addition, Table 1 below shows the dielectric grain size or the grain density expressed as a ratio of an average dielectric grain size or a ratio of average density in the first region 111a to the average dielectric grain size or the average density in each region.

There is no particular limit to a method of measuring the average dielectric grain size or the average density in the first or second region 111a or 111b, and that in the second margin portion WM1 or WM2. The ratio is obtained by polishing the multilayer electronic component 100 to its center in the first direction to expose the cross sections (or LW sections) in the second and third directions, and then performing the measurement at a 15 μm×15 μm region of each center of any first region, the second region 111a or 111b, and the second margin portion WM1 or WM2 by using the scanning electronic microscope (SEM). The ratio is its average value measured at any five or more points at the 15 μm*15 μm region.

In addition, the value of the break down voltage (BDV) (V) shown in Table 1 below are measured under conditions of 100 V/s step-up and 20 mA. The break down voltage is measured as a voltage when the insulation resistance (IR) value drops to 10000Ω or less, and uses an average value of values measured in 125 multilayer electronic component samples.

TABLE 1

| | | | | | Micro structure | | | | | |
| | | | | | Average grain size (compared to first region) | | Grain density (compared to first region) | | | |
| | | Si/Ti | Dy/Ti | | | | | | | |
| Test no. | Mn/Ti Second region | Second margin portion | Second region | Second margin portion | Second region | Second margin portion | Second region | Second margin portion | BDV(V) | Characteristics evaluation |
|---|---|---|---|---|---|---|---|---|---|---|
| 1 | 1 | 1 | 1 | 1 | 67% | 68% | 98.14% | 99.07% | 74.9 | OK |
| 2 | 1.3 | 1 | 1 | 1 | 74% | 67% | 98.54% | 99.11% | 76.7 | OK |
| 3 | 1.6 | 1 | 1 | 1 | 78% | 68% | 98.89% | 99.13% | 77.5 | OK |
| 4 | 1.9 | 1 | 1 | 1 | 89% | 68% | 99.24% | 99.05% | 79.0 | OK |
| 5 | 2.2 | 1 | 1 | 1 | 78% | 67% | 97.69% | 98.54% | 73.1 | NG |
| 6 | 1 | 1.3 | 1 | 1 | 67% | 73% | 98.04% | 99.15% | 75.2 | OK |
| 7 | 1 | 1.6 | 1 | 1 | 69% | 83% | 98.11% | 99.31% | 75.9 | OK |
| 8 | 1 | 1.9 | 1 | 1 | 69% | 85% | 98.25% | 99.34% | 76.9 | OK |
| 9 | 1 | 2.2 | 1 | 1 | 68% | 84% | 97.88% | 98.32% | 71.7 | NG |
| 10 | 1.3 | 1.3 | 1 | 1 | 76% | 74% | 98.57% | 99.13% | 78.1 | OK |
| 11 | 1.6 | 1.6 | 1 | 1 | 86% | 85% | 98.92% | 99.34% | 79.4 | OK |
| 12 | 1.9 | 1.9 | 1 | 1 | 91% | 91% | 99.31% | 99.48% | 79.5 | OK |
| 13 | 2.2 | 2.2 | 1 | 1 | 90% | 90% | 97.46% | 98.81% | 70.9 | NG |
| 14 | 1 | 1 | 1.3 | 1 | 72% | 67% | 98.20% | 99.12% | 76.9 | OK |

TABLE 1-continued

| | | | | | | Micro structure | | | | |
|---|---|---|---|---|---|---|---|---|---|---|
| | Element compositions in each region (compared to first region) | | | | Average grain size (compared to first region) | | Grain density (compared to first region) | | | |
| | | Si/Ti | | Dy/Ti | | | | | | |
| Test no. | Mn/Ti Second region | Second margin portion | Second region | Second margin portion | Second region | Second margin portion | Second region | Second margin portion | BDV(V) | Characteristics evaluation |
| 15 | 1 | 1 | 1.3 | 1.3 | 74% | 75% | 98.24% | 99.11% | 78.6 | OK |
| 16 | 1 | 1 | 1.6 | 1.6 | 78% | 77% | 98.18% | 99.17% | 79.2 | OK |
| 17 | 1 | 1 | 1.9 | 1.9 | 86% | 87% | 98.27% | 99.22% | 81.1 | OK |
| 18 | 1 | 1 | 2.2 | 2.2 | 86% | 88% | 98.07% | 97.43% | 72.5 | NG |
| 19 | 1.9 | 1.9 | 1.9 | 1.9 | 95% | 93% | 99.40% | 99.58% | 83.9 | OK |

Test nos. 2 to 4 show a case where the ratio of the content of manganese (Mn) to the content of titanium (Ti) in the second region is more than 1 time and 1.9 times or less compared to the ratio of the content of manganese (Mn) to the content of titanium (Ti) in the first region, and it may be seen that a difference in the average grain size and the grain density in the first region and those in the second region is reduced to thus improve the break down voltage (BDV) characteristic of the multilayer electronic component.

Test no. 5 shows a case where the ratio of the content of manganese (Mn) to the content of titanium (Ti) in the second region is more than 1.9 times compared to the ratio of the content of manganese (Mn) to the content of titanium (Ti) in the first region, and it may be seen that a difference in the average grain size and the grain density in the first region and those in the second region is not sufficiently reduced to thus deteriorate the break down voltage (BDV) characteristic of the multilayer electronic component.

Test nos. 6 to 8 show a case where the ratio of the content of silicon (Si) to the content of titanium (Ti) in the second margin portion is more than 1 time and 1.9 times or less compared to the ratio of the content of silicon (Si) to the content of titanium (Ti) in the first region, and it may be seen that the difference in the average grain size and the grain density in the first region and those in the second margin portion is reduced to thus improve the break down voltage (BDV) characteristic of the multilayer electronic component.

Test no. 9 shows a case where the ratio of the content of silicon (Si) to the content of titanium (Ti) in the second margin portion is more than 1.9 times compared to the ratio of the content of silicon (Si) to the content of titanium (Ti) in the first region, and it may be seen that the difference in the average grain size and the grain density in the first region and those in the second margin portion is not sufficiently reduced to thus deteriorate the break down voltage (BDV) characteristic of the multilayer electronic component.

Test nos. 10 to 12 show a case where the ratio of the content of manganese (Mn) to the content of titanium (Ti) in the second region is more than 1 time and 1.9 times or less compared to the ratio of the content of silicon (Si) to the content of titanium (Ti) in the first region, and the ratio of the content of silicon (Si) to the content of titanium (Ti) in the second margin portion is more than 1 time and 1.9 times or less compared to the ratio of the content of manganese (Mn) to the content of titanium (Ti) in the first region. Here, it may be seen that the difference in the average grain size and the grain density in the first region and those in the second region, and those in the second margin portion are reduced to thus further improve the break down voltage (BDV) characteristic of the multilayer electronic component.

Test no. 13 shows a case where the ratio of the content of manganese (Mn) to the content of titanium (Ti) in the second region is more than 1.9 times compared to the ratio of the content of manganese (Mn) to the content of titanium (Ti) in the first region, and the ratio of the content of silicon (Si) to the content of titanium (Ti) in the second margin portion is more than 1.9 times compared to the ratio of the content of silicon (Si) to the content of titanium (Ti) in the first region. Here, it may be seen that the difference in the average grain size and the grain density in the first region, those in the second region, and those in the second margin portion are not sufficiently reduced to thus deteriorate the break down voltage (BDV) characteristic of the multilayer electronic component.

Test nos. 14 to 17 show a case where the ratio of the content of dysprosium (Dy) to the content of titanium (Ti) in the second region is more than 1 time and 1.9 times or less compared to the ratio of the content of dysprosium (Dy) to the content of titanium (Ti) in the first region, and the ratio of the content of dysprosium (Dy) to the content of titanium (Ti) in the second margin portion is more than 1 time and 1.9 times or less compared to the ratio of the content of dysprosium (Dy) to the content of titanium (Ti) in the first region. Here, it may be seen that the difference in the average grain size and the grain density in the first region, those in the second region, and those in the second margin portion are reduced to thus further improve the break down voltage (BDV) characteristic of multilayer electronic component.

Test no. 18 shows a case where the ratio of the content of dysprosium (Dy) to the content of titanium (Ti) in the second region is more than 1.9 times compared to the ratio of the content of dysprosium (Dy) to the content of titanium (Ti) in the first region, and the ratio of the content of dysprosium (Dy) to the content of titanium (Ti) in the second margin portion is more than 1.9 times compared to the ratio of the content of dysprosium (Dy) to the content of titanium (Ti) in the first region. Here, it may be seen that the difference in the average grain size and the grain density in the first region, those in the second region, and those in the second margin portion are not sufficiently reduced to thus deteriorate the break down voltage (BDV) characteristic of the multilayer electronic component.

FIG. 10 shows a measured grain size based on its position in a dielectric layer based on cross sections of a multilayer electronic component in a comparative example (Test no. 1 of Table 1) in first and third directions.

FIG. 11 shows a measured grain size based on its position in a dielectric layer based on cross sections of the multilayer electronic component in an inventive example (Test no. 19 of Table 1) in first and third directions.

The grain size in the dielectric layer is measured based on its position by polishing the multilayer electronic component to its center to expose cross sections (or wt cross sections) in the first and third directions, and then performing the measuring at four points ①, ②, ③, and ④ from the dielectric layer that is adjacent to the center in the third direction and the first surface to the dielectric layer that is disposed at a center of the capacitance formation portion and three points ⑤, ⑥, and ⑦ from the center of the capacitance formation portion to the dielectric layer that is adjacent to the fourth surface in the third direction.

Referring to FIG. 10, the dielectric layer shows a similar level of grain size distribution at the points ①, ②, ③, and ④, while the dielectric layer has smaller grain sizes at the points ⑤, ⑥, and ⑦.

Referring to FIG. 11, the dielectric layer shows a similar level of grain size distribution at all the points ① through ⑦. Therefore, the multilayer electronic component 100 according to still another exemplary embodiment may have the improved break down voltage (BDV) characteristic by making the ratio of the content of at least one of manganese (Mn), dysprosium (Dy), and silicon (Si) to the content of titanium (Ti) in the second region 111b or the second margin portion WM1 or WM2 higher than the ratio of the content of at least one of manganese (Mn), dysprosium (Dy), and silicon (Si) to the content of titanium (Ti) in the first region to thus reduce the grain size dispersion in the dielectric layer based on its position.

As set forth above, the present disclosure may provide the multilayer electronic component which may suppress the step difference occurring due to the difference in the stacking degrees of the internal electrodes and the dielectric layers by forming the dielectric layer of the multilayer electronic component into the regions having the different element compositions, and simultaneously suppress the deterioration of the break down voltage (BDV) characteristic by adjusting the ratio of the content of the element in each dielectric layer, included in the capacitance formation portion and the margin portion.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a dielectric layer and first and second internal electrodes alternately disposed in the first direction while having the dielectric layer interposed therebetween; and
external electrodes respectively disposed on the third and fourth surfaces,
wherein the body includes a capacitance formation portion in which the dielectric layer and first or second internal electrode overlap each other in the first direction, a first margin portion disposed on one surface or the other surface of the capacitance formation portion in the second direction, and a second margin portion disposed on one surface or the other surface of the capacitance formation portion in the third direction,
a first region is a region of the dielectric layer that is included in the capacitance formation portion and a second region is a region of the dielectric layer that is included in the first margin portion,
the first or second region includes manganese (Mn) and titanium (Ti), and
a ratio of a content of manganese (Mn) to a content of titanium (Ti) in the second region is more than 1 time and 1.9 times or less compared to a ratio of a content of manganese (Mn) to a content of titanium (Ti) in the first region.

2. The multilayer electronic component of claim 1, wherein the first region further includes silicon (Si), the second margin portion includes silicon (Si) and titanium (Ti), and
a ratio of a content of silicon (Si) to a content of titanium (Ti) in the second margin portion is more than 1 time and 1.9 times or less compared to a ratio of a content of silicon (Si) to the content of titanium (Ti) in the first region.

3. The multilayer electronic component of claim 1, wherein the first or second region further includes dysprosium (Dy), and
a ratio of a content of dysprosium (Dy) to the content of titanium (Ti) in the second region is more than 1 time and 1.9 times or less compared to a ratio of the content of dysprosium (Dy) to the content of titanium (Ti) in the first region.

4. The multilayer electronic component of claim 1, wherein the first region further includes dysprosium (Dy), the second margin portion includes dysprosium (Dy) and titanium (Ti), and
a ratio of a content of dysprosium (Dy) to a content of titanium (Ti) in the second margin portion is more than 1 time and 1.9 times or less compared to a ratio of the content of dysprosium (Dy) to the content of titanium (Ti) in the first region.

5. The multilayer electronic component of claim 1, wherein the second region further includes at least one of barium (Ba), calcium (Ca), aluminum (Al), lithium (Li), sodium (Na), copper (Cu), and zinc (Zn).

6. The multilayer electronic component of claim 1, wherein the second region further includes at least one of holmium (Ho) and yttrium (Y).

7. The multilayer electronic component of claim 1, wherein the second margin portion further includes at least one of barium (Ba), calcium (Ca), aluminum (Al), lithium (Li), sodium (Na), copper (Cu), and zinc (Zn).

8. The multilayer electronic component of claim 1, wherein the second margin portion further includes at least one of holmium (Ho) and yttrium (Y).

9. A multilayer electronic component comprising:
a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a dielectric layer and first and second internal electrodes alternately disposed in the first direction while having the dielectric layer interposed therebetween; and external electrodes respectively disposed on the third and fourth surfaces, wherein the body includes a capacitance formation portion in which the dielectric layer and first or second internal electrode overlap each other in the first direction, a first margin portion disposed on one surface or the other surface of the capacitance formation portion in the second direction, and a second margin portion disposed on one surface or the other surface of the capacitance formation portion in the third direction, a first region is a region of the dielectric layer that is included in the capacitance formation portion and a second region is a region of the dielectric layer that is included in the first margin portion, the first region or the second margin portion includes silicon (Si), dysprosium (Dy), or titanium (Ti), a ratio of a content of silicon (Si) to a content of titanium (Ti) in the second margin portion is more than 1 time and 1.9 times or less compared to a ratio of a content of silicon (Si) to a content of titanium (Ti) in the first region, and a ratio of a content of dysprosium (Dy) to the content of titanium (Ti) in the second margin portion is more than 1 time and 1.9 times or less compared to a ratio of a content of dysprosium (Dy) to the content of titanium (Ti) in the first region.

10. The multilayer electronic component of claim 9, wherein the second region includes dysprosium (Dy) and titanium (Ti), and a ratio of a content of dysprosium (Dy) to a content of titanium (Ti) in the second region is more than 1 time and 1.9 time or less compared to the ratio of the content of dysprosium (Dy) to the content of titanium (Ti) in the first region.

11. The multilayer electronic component of claim 9, wherein the second region further includes at least one of barium (Ba), calcium (Ca), aluminum (Al), lithium (Li), sodium (Na), copper (Cu), and zinc (Zn).

12. The multilayer electronic component of claim 9, wherein the second region further includes at least one of dysprosium (Dy), holmium (Ho) and yttrium (Y).

13. The multilayer electronic component of claim 9, wherein the second margin portion further includes at least one of barium (Ba), calcium (Ca), aluminum (Al), lithium (Li), sodium (Na), copper (Cu), and zinc (Zn).

14. The multilayer electronic component of claim 9, wherein the second margin portion further includes at least one of holmium (Ho) and yttrium (Y).

15. A multilayer electronic component comprising:

a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a dielectric layer and first and second internal electrodes alternately disposed in the first direction while having the dielectric layer interposed therebetween; and external electrodes respectively disposed on the third and fourth surfaces, wherein the body includes a capacitance formation portion in which the dielectric layer and first or second internal electrode overlap each other in the first direction, a first margin portion disposed on one surface or the other surface of the capacitance formation portion in the second direction, and a second margin portion disposed on one surface or the other surface of the capacitance formation portion in the third direction, a first region is a region of the dielectric layer that is included in the capacitance formation portion and a second region is a region of the dielectric layer that is included in the first margin portion, and a ratio of a content of element R1 to a content of titanium (Ti) in the second region is more than 1 time and 1.9 times or less compared to a ratio of a content of the element R1 to a content of titanium (Ti) in the first region.

16. The multilayer electronic component of claim 15, wherein the element R1 is one selected from the group consisting of manganese (Mn) and dysprosium (Dy).

17. The multilayer electronic component of claim 15, wherein a ratio of a content of element R2 to a content of titanium (Ti) in the second margin portion is more than 1 time and 1.9 times or less compared to a ratio of a content of the element R2 to the content of titanium (Ti) in the first region.

18. The multilayer electronic component of claim 17, wherein the element R2 is one selected from the group consisting of silicon (Si) and dysprosium (Dy).

19. The multilayer electronic component of claim 15, wherein the second region further includes at least one of barium (Ba), calcium (Ca), aluminum (Al), lithium (Li), sodium (Na), copper (Cu), and zinc (Zn).

20. The multilayer electronic component of claim 15, wherein the second region further includes at least one of holmium (Ho) and yttrium (Y).

21. The multilayer electronic component of claim 15, wherein the second margin portion further includes at least one of barium (Ba), calcium (Ca), aluminum (Al), lithium (Li), sodium (Na), copper (Cu), and zinc (Zn).

22. The multilayer electronic component of claim 15, wherein the second margin portion further includes at least one of holmium (Ho) and yttrium (Y).

\* \* \* \* \*